United States Patent [19]
Payette

[11] Patent Number: 5,749,286
[45] Date of Patent: May 12, 1998

[54] FONDUE COOKING APPARATUS

[76] Inventor: Michel Payette, 2078 De Romagne, Vimont, Laval, Que. H7M5T1, Canada

[21] Appl. No.: 454,577

[22] Filed: May 30, 1995

[51] Int. Cl.$^6$ ........................................ A47J 37/04
[52] U.S. Cl. ...................... 99/413; 99/416; 99/419; 99/421 A; 99/421 V; 99/448; 30/323
[58] Field of Search .................. 99/403, 410, 411, 99/412, 413, 414, 415, 416, 417, 419, 421 R, 421 V, 421 A, 348, 448; 30/322, 323; 248/683

[56] References Cited

U.S. PATENT DOCUMENTS

| | | | |
|---|---|---|---|
| 1,121,657 | 12/1914 | Parker | 30/322 |
| 2,864,163 | 12/1958 | Boruvka | 30/322 |
| 3,038,402 | 6/1962 | Singer | 99/403 |
| 3,078,787 | 2/1963 | Arseneault | 99/419 |
| 3,211,081 | 10/1965 | Miceli | 99/421 V |
| 3,543,674 | 12/1970 | Kunze | 99/403 |
| 3,585,050 | 6/1971 | Singer et al. | 99/421 A |
| 3,858,496 | 1/1975 | Downers | 99/413 |
| 4,589,333 | 5/1986 | Murphy | 99/446 |
| 4,638,786 | 1/1987 | Lucky | 126/24 |
| 5,154,116 | 10/1992 | Dube | 99/403 |

Primary Examiner—David Scherbel
Assistant Examiner—James F. Hook
Attorney, Agent, or Firm—Mila Shvartsmad

[57] ABSTRACT

The present invention relates to a cooking apparatus comprising a combination of a vessel having an upstanding wall defining an upper edge providing a supporting surface for a removable cover having a centrally located opening. The cover is adapted to fit over the upper edge of the vessel. The apparatus also has a number of holding elements located on the cover, each of the holding elements being adapted to hold at least one utensil for carrying food. The holding element supports the utensil in a substantially vertical position. Each of the holding elements further comprises a utensil receiving slot adapted to facilitate positioning of the utensil within the holding element. In one variant, the number of holding elements are permanently mounted on, and are an integral part of the cover. The holding element comprises a stabilizing structure, the stabilizing structure being adapted to cooperate with a corresponding stabilizing element of the utensil, and to keep the utensil in a substantially vertical position. In the other variant, the holding elements are removable, and may be attached to any fondue cover provided with a central opening.

11 Claims, 12 Drawing Sheets

FONDUE COOKING APPARATUS

The present invention is related to a cooking device, and more particularly, to a fondue cooking apparatus.

There is known U.S. Pat. No. 3,038,402 related to a cooking device comprising a cover dish having an opening therein to permit the placing of an edible object carried by a utensil within a dish through the opening provided with a plurality of utensil receiving slots.

There is also known U.S. Pat. No. 3,543,674 related to a fondue cooking utensil comprising a pan and a sheet metal insert by which the pan may be adapted for fondue cooking, wherein said insert also serves as a fork holder.

There is also known U.S. Pat. No. 5,154,116 related to a fork supporting device for fondue pot comprising vertical rod supported over an opened top of cooking pot by means of legs and a disk-shaped plate mounted on said rod having a plurality of bays around its peripheral edge for supporting forks in vertical direction.

The object of the present invention is to allow the user of the fondue apparatus to cook food in a secure and convenient manner, giving free and easy access into the fondue pot without a central interfering structure, and in the meantime to hold utensils such as forks in a substantially vertical position.

It is also the object of the present invention to provide a structure which prevents the splashing of hot oils or liquids, which, at the same time, keeps forks in s stable position while the food attached to those forks is prepared.

Still another object of the present invention is to provide an adjustable fondue fork, allowing to fit any pot size in a substantially vertical position and having a structure adapted to securely hold food during the process of preparation.

The construction designed to carry out the invention will be hereinafter described, together with other features thereof.

SUMMARY OF THE INVENTION

Broadly the present invention comprises a cooking apparatus comprising a combination of a vessel having an upstanding wall defining an upper edge providing a supporting surface for a removable cover having a centrally located opening therein, said cover is adapted to fit over the upper edge of said vessel;

a number of holding elements located on said cover, each of said holding elements is adapted to hold at least one utensil for carrying food, wherein said holding element is supporting said utensil in substantially vertical position. Each of said holding elements further comprises a utensil receiving slot adapted to facilitate positioning of said utensil within the holding element. Said number of holding elements are permanently mounted on said cover, and are an integral part of said cover. Said utensil receiving slot is adapted to function as the holding element, and wherein said utensil is provided with a stabilizing element adapted to cooperate with said slot to facilitate support of said utensil in substantially vertical position. Said holding element comprises a stabilizing means, said stabilizing means are adapted to cooperate with a corresponding stabilizing element of said utensil and to keep said utensil in substantially vertical position.

Another embodiment of the present invention comprises a removable cover having a centrally located opening therein, said cover is adapted to fit over an upper edge of a cooking vessel;

a number of holding elements located on said cover, each of said holding elements is adapted to hold at least one utensil for carrying food, wherein said holding element is supporting said utensil in substantially vertical position. Each of said holding elements further comprises a utensil receiving slot adapted to facilitate positioning of said utensil within the holding element, and said holding elements are permanently mounted on said cover. Said holding elements are an integral part of said cover, and comprise a stabilizing means, said stabilizing means are adapted to cooperate with a corresponding stabilizing element of said utensil to keep said utensil in substantially vertical position.

Yet another embodiment of the present invention comprises a holding element comprising:

an insulation housing provided with a stabilizing means, a utensil receiving slot adapted to facilitate positioning of a utensil for carrying food within the holding element, wherein said holding element is adapted to be mounted on a cover of a cooking vessel provided with a central opening and wherein said holding element is adapted to hold said utensil in substantially vertical position by means of said stabilizing means. Said utensil receiving slot comprises an upper utensil receiving slot extending from a top portion of said housing and a lower receiving slot extending from a bottom portion of said housing, wherein said upper and lower receiving slots are aligned to each other and provided to facilitate vertical stable suspension of said utensil. Said stabilizing means comprises a disk-shaped groove formed on said housing, wherein said groove is adapted to cooperate with a handle portion of said utensil, or said stabilizing means is a magnet accommodated within said housing. Said holding element is releasably mounted on said cover or each of said holding element is mounted on said cover by means of U-shaped clip.

Still another embodiment of the present invention comprises a utensil comprising a stem, a handle connected to said stem at one end, and tines connected to said stem at the opposite end, and an adjustment means adapted to adjust the length of said utensil. Said utensil further comprises a stabilizing element located between said handle and said tines, wherein said stabilizing element is provided to keep said utensil in substantially vertical position while held on a cover of a cooking vessel. Said stabilizing element comprises a semi-spherical element, or at least two arms extending transversely from said utensil. Said adjustment means comprises a bore portion located within said handle, said bore portion having a thread adapted to receive the end of said stem provided with corresponding thread, wherein the adjustment is provided by means of advancing of the end of said stem within said bore portion.

In yet still another embodiment of the present invention, the extreme end of each tine is bent in the opposite direction from each other with relation to the plane surface thus facilitating a secure hold of a piece of food impaled on said tines. Alternatively, each tine is bent outwardly and then near the middle is bent parallel to each other. Said stabilizing element has a disk-shaped or a spherical configuration, and wherein said handle and said stabilizing element form an integral element.

BRIEF DESCRIPTION OF DRAWINGS

The invention will be more readily understood from a reading of the following specification, and by references to the accompanying drawings forming a part thereof, wherein an example of the invention is shown and wherein.

5,749,286

3

4

DETAILED DESCRIPTION OF THE INVENTION

Figure 28:
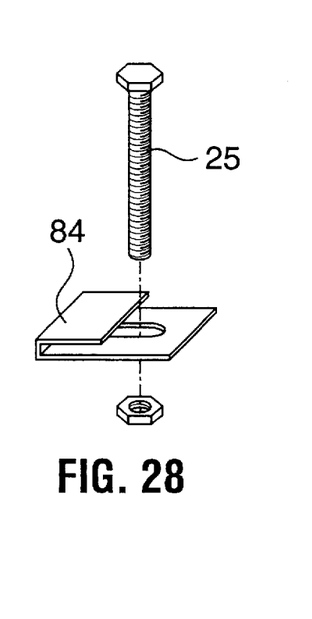
FIG. 28 is a perspective view of U-shaped clip.

Referring now to drawings, FIGS. 1 to 8 show the first embodiment of the present invention comprising a fondue apparatus 10 including a cooking vessel 12 with a cover 14 adapted to fit over an upper edge of said cooking vessel. The cover 14 also is adapted to carry a number of holding elements 16. Each of holding elements 16 is adapted to hold utensils for carrying food 46 in substantially vertical position and may be mounted on the cover 14 in a temporary or permanent manner depending on the type of the cooking vessel. In one modification, such holding elements 16 (see FIG. 4) may be installed on the conventional cover (not shown) provided with a central opening by means of U-shaped clip shown on FIG. 28. In this modification, holding elements 16 are mounted on the upper surface of the cover; however the present invention is not restricted to such an arrangement.

Figures 3, 4:
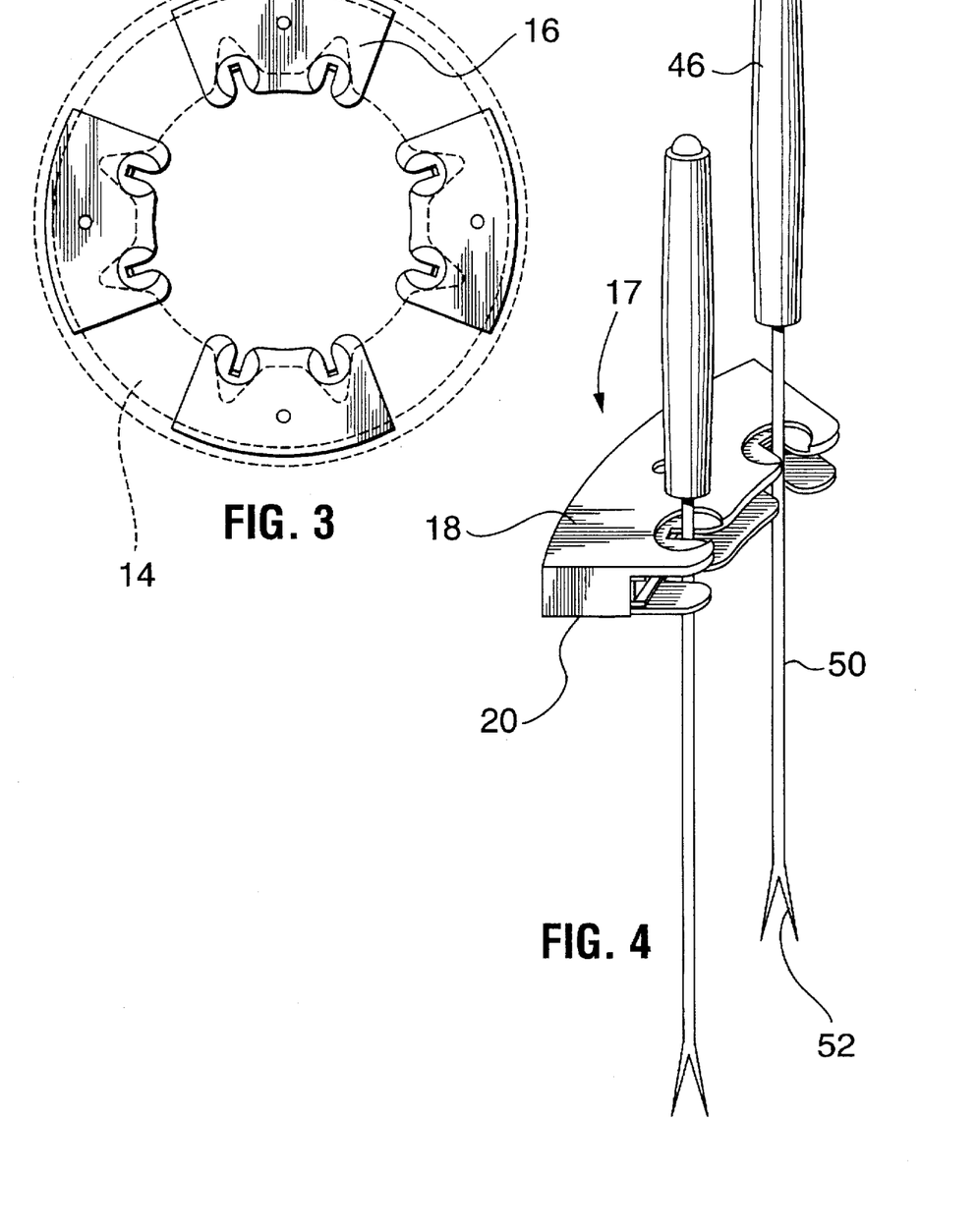
FIG. 3 is a top view of another modification of the first embodiment showing magnetic holding elements mounted on top surface of the cover according to the present invention.
FIG. 4 is a perspective view of separate magnetic holding element with attached fondue forks.
Figure 5:
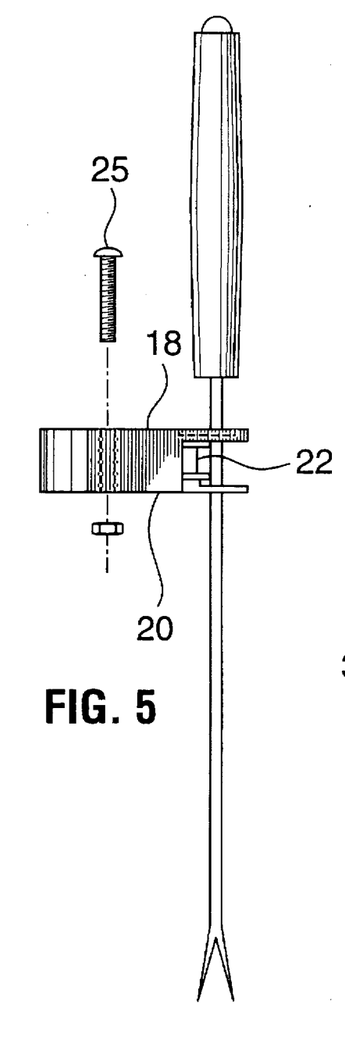
FIG. 5 is cross-sectional view of FIG. 4.
Figure 6:
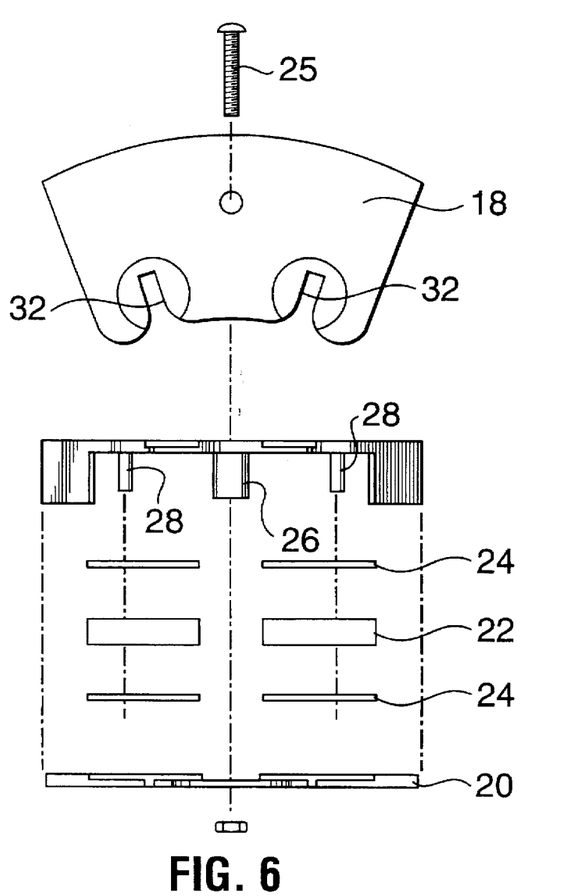
FIG. 6 is a dis-assembled view of the holding element of FIG. 4.

In the other modification shown on FIG. 3, the holding elements 16 are mounted on the upper surface of the cover specially designed for carrying holding elements and provided with the central opening having configuration facilitating vertical suspension of utensil by means of notches around the inner edge of the central opening.

Figure 1:
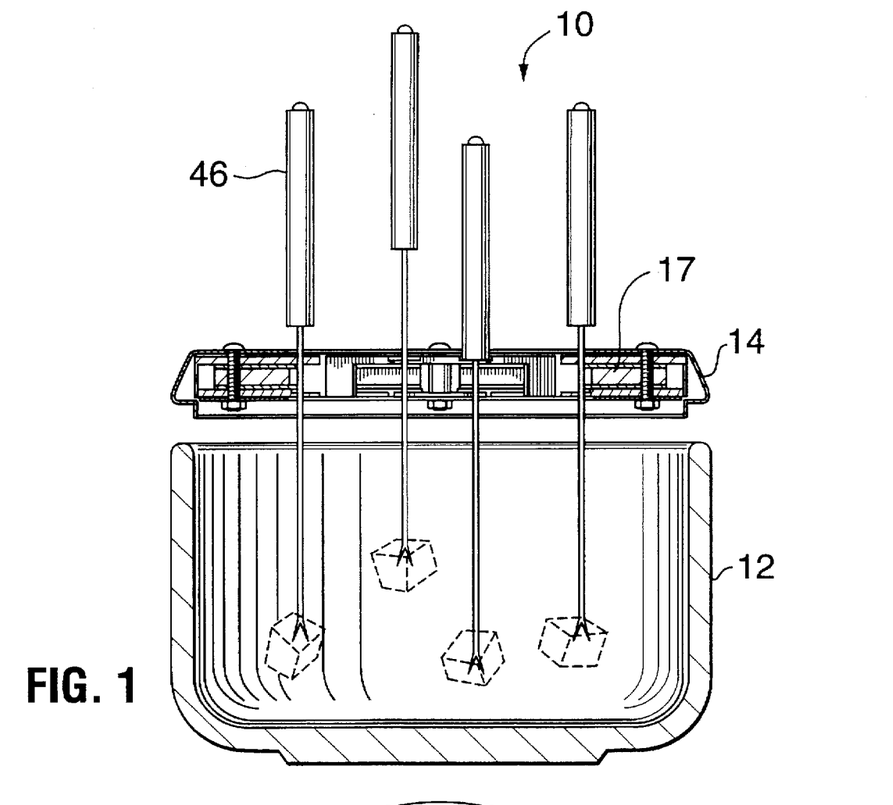
FIG. 1 is a cross-sectional of the first embodiment of the present invention having magnetic holding elements.
Figure 2:
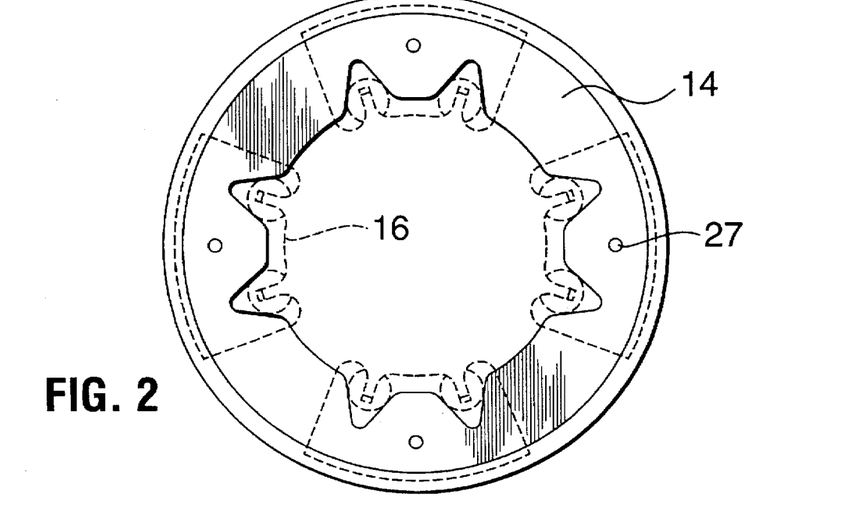
FIG. 2 is a top view of FIG. 1.
Figure 8:
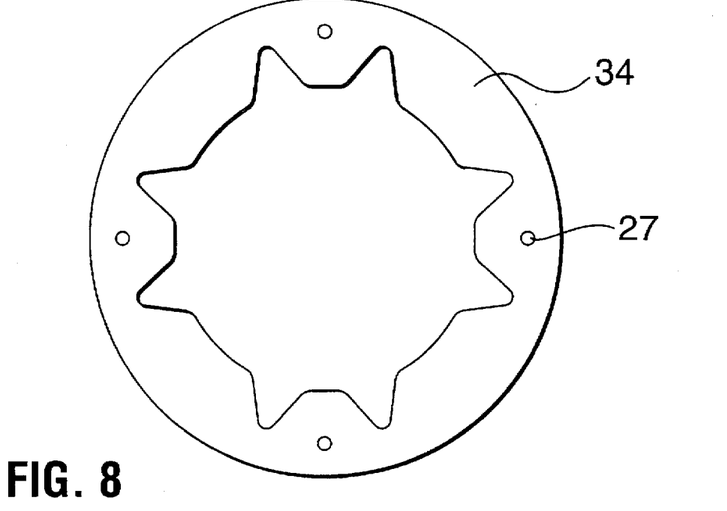
FIG. 8 is a top view of mounting ring of the first embodiment of the present invention.
Figure 9:
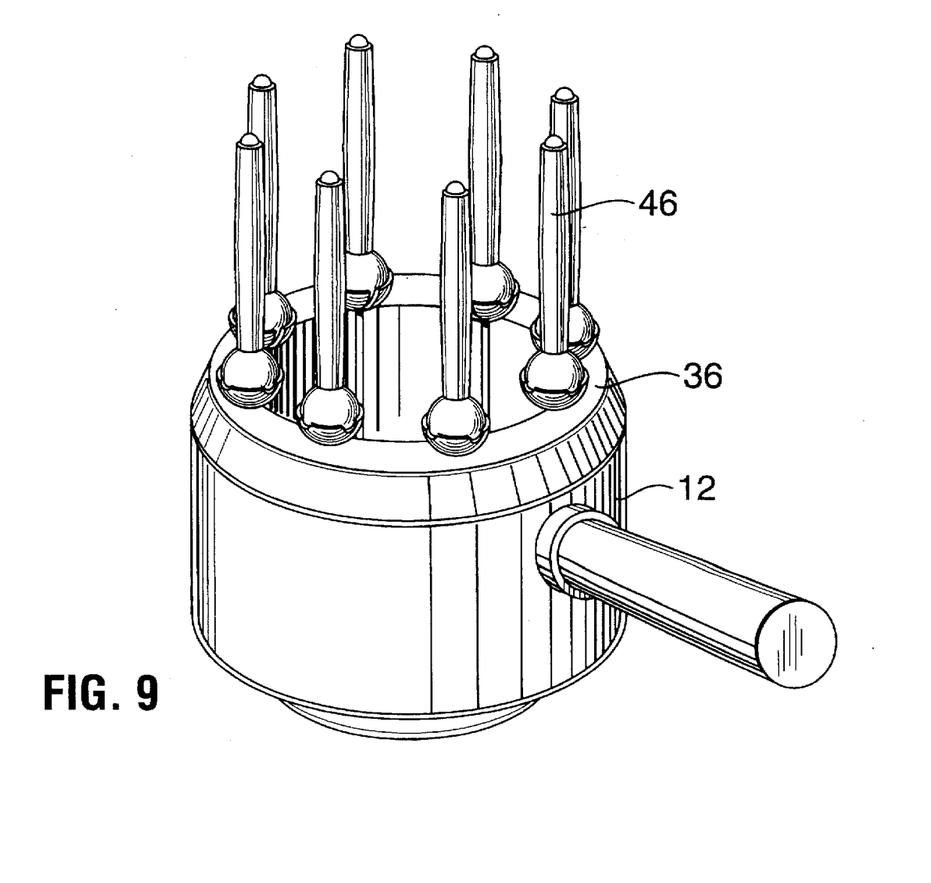
FIG. 9 is a perspective view of second modification of present invention.
Figure 10:
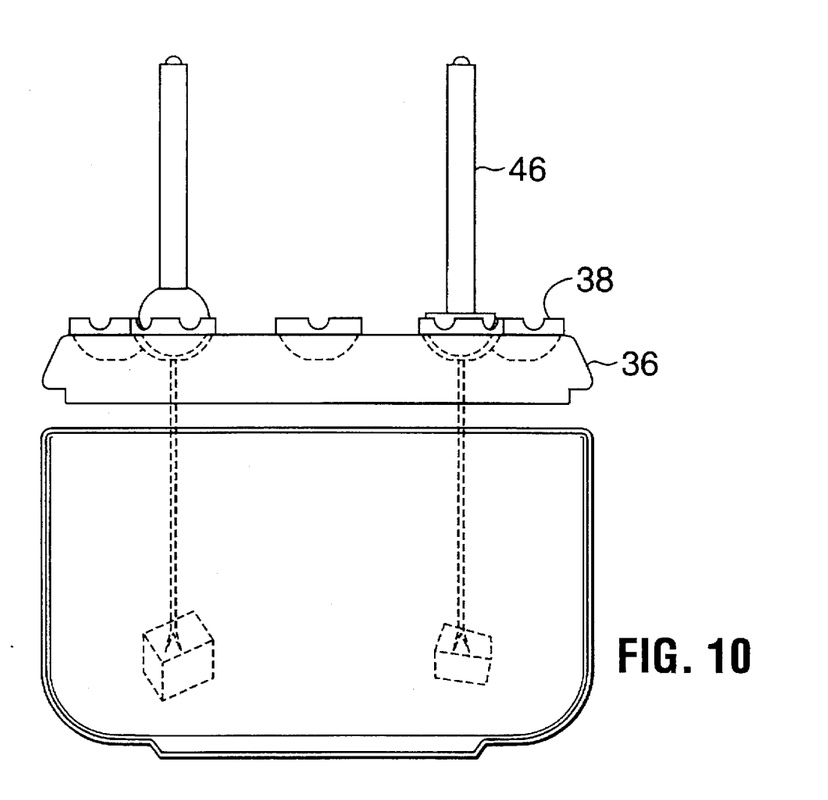
FIG. 10 is a side view of FIG. 9.
Figure 11:
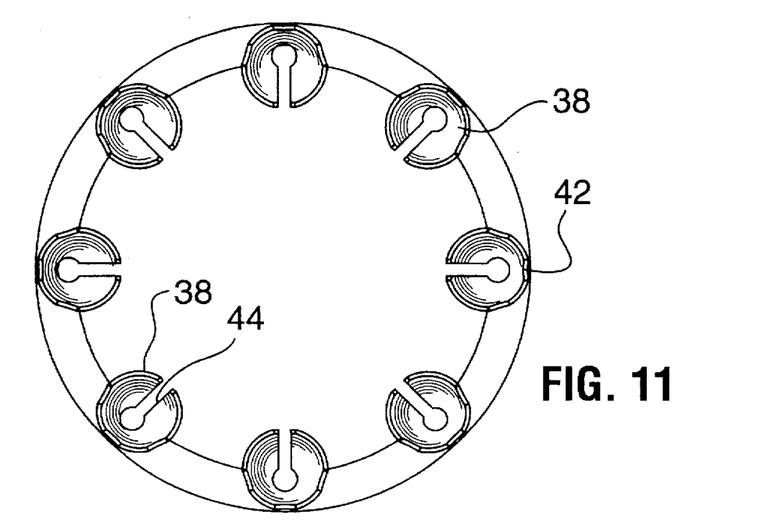
FIG. 11 is a top view of FIG. 9.

In the other embodiment shown on FIG. 1 and 2, holding elements 16 are mounted between the cover 14 and a mounting ring 34 (see FIG. 8). Preferably, but not necessarily, said mounting ring is located underneath of the cover 14.

FIGS. 4 to 7 show holding element 16 comprising an insulation housing 17 accommodating magnetic elements 22 which are additionally insulated by means of insulating plates 24 made of galvanized metal. The housing 17 comprises top portion 18 and bottom portion 20 which are connected to each other in a pressure snap-tight manner by means of plastic pins 28 formed underneath the top portion 18. The pins 28 are used as a stability guide for plates 24 and magnet 22. Both top and bottom portions 18 and 20 are provided with utensil receiving slots 32 aligned with each other and adapted to facilitate vertical positioning of the utensils 46 within the holding element 16. The cooperation of those aligned sets of slots 32 and magnet 22 allows to suspend the utensil 46 in substantially vertical position and prevent any front or side shifting, thus guarantying stability of the utensil 46 in use. The utensil 46 used in combination with this embodiment comprises a stem 50 made of any metal adapted to be attracted to the magnet 22. Preferably, but not necessary, stem 50 is made of stainless steel. The holding element 16 is permanently attached to the cover 14 by means of a set of a nut and a bolt 25 adapted to be inserted into the corresponding bore portion 26 located underneath the top portion 18. Preferably, but not necessarily, those bolts and nuts are made of stainless steel. The surface of the cover 14 is provided with the openings 27 adapted to receive bolt 25. However, the present invention is not restricted to such arrangement, and any other mechanical equivalents for permanent attachment may be used for the same purpose.

Figure 7:
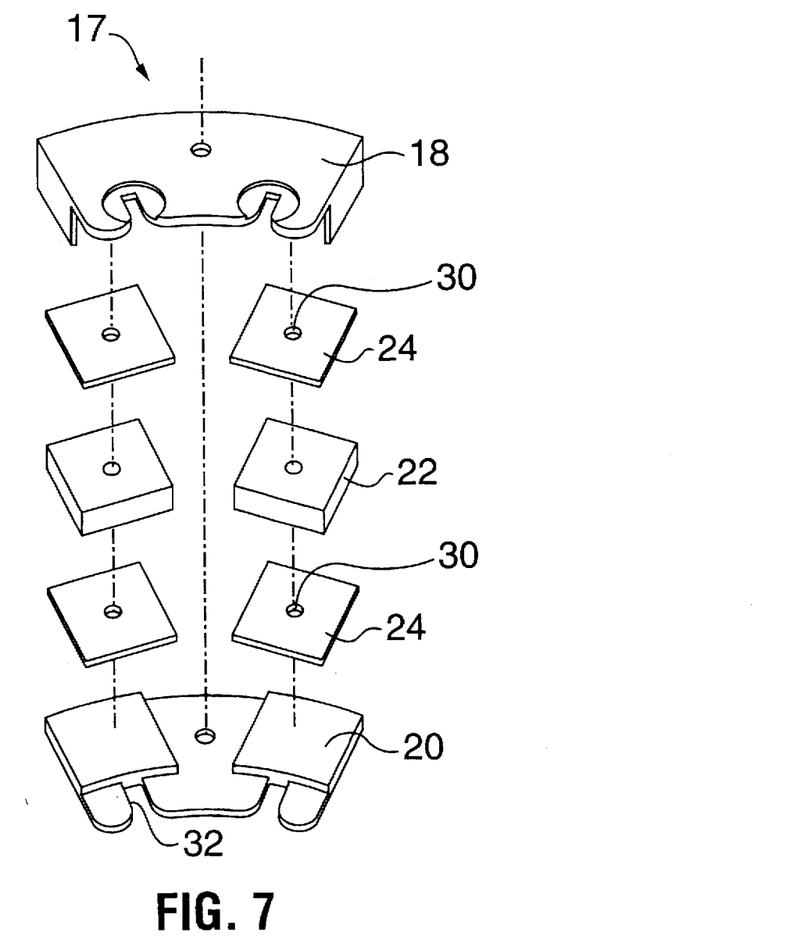
FIG. 7 is a perspective dis-assembled view of the magnetic holding element of FIG. 4.

FIG. 7 show the structure of the holding element using magnets 22, top 18, and bottom 20 portions and insulating plates 24 of different shapes. Most importantly, holding elements 16 according to the present invention may be mounted at any desired position, such as top of cover 14, underneath of this cover, or between the cover and mounting ring 34.

FIGS. 9 to 14 show a second modification of the present invention comprising the cover 36 provided with a number of holding elements 38 which are an integral part of cover 36. Each of those elements 38 comprises a stabilizing means adapted to cooperate with the corresponding stabilising element of the utensil 46 to keep said utensil suspended in a vertical position. Each holding element is provided with the utensil receiving slot 44 similar to slot 32 of the first embodiment. Those stabilizing means are better shown on FIGS. 12 to 14. The configuration of stabilizing means of the holding element 38 depends on the configuration of the stabilizing element of the utensil 46. For example, if the stabilizing element is made of spherical or semi-spherical configuration (see FIGS. 15 and 19), stabilizing means are made in the shape of semi-spherical cavity 40 adapted to cooperate with this corresponding stabilizing element 58 or 60 respectively. In case the stabilizing element has arms extending transversely from the utensil 46 (see FIGS. 20 to 23), the stabilizing means comprises horizontally located grooves 42 formed on the holding element 38 which are adapted to cooperate with the arms of the utensil 46 to suspend it in vertical position. Preferably, holding element 38 comprises both; cavity 40 and grooves 42 which allows to use stabilizing elements of different configuration.

Figure 25A:
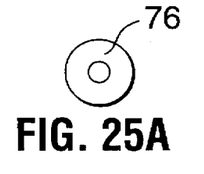
FIG. 25A is top view of disk-shaped stabilizing element.
Figure 25B:
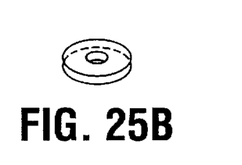
FIG. 25B is a perspective view of FIG. 25A.
Figure 26:
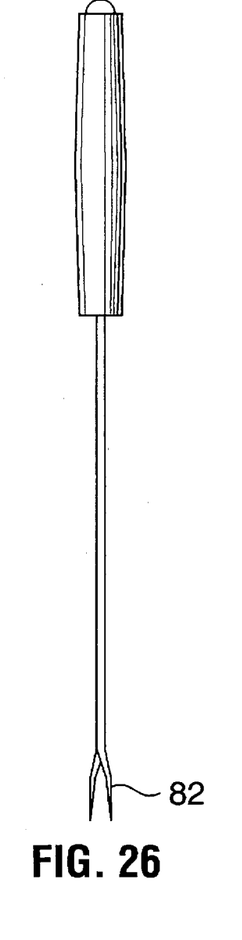
FIG. 26 is side view of the fork having tines bent parallel.

FIGS. 25A and 25B shows yet another modification of the stabilizing element in the shape of disk 76 which is adapted to fit over holding element 38.

Figures 12, 13, 14, 15, 16, 17, 18, 19:
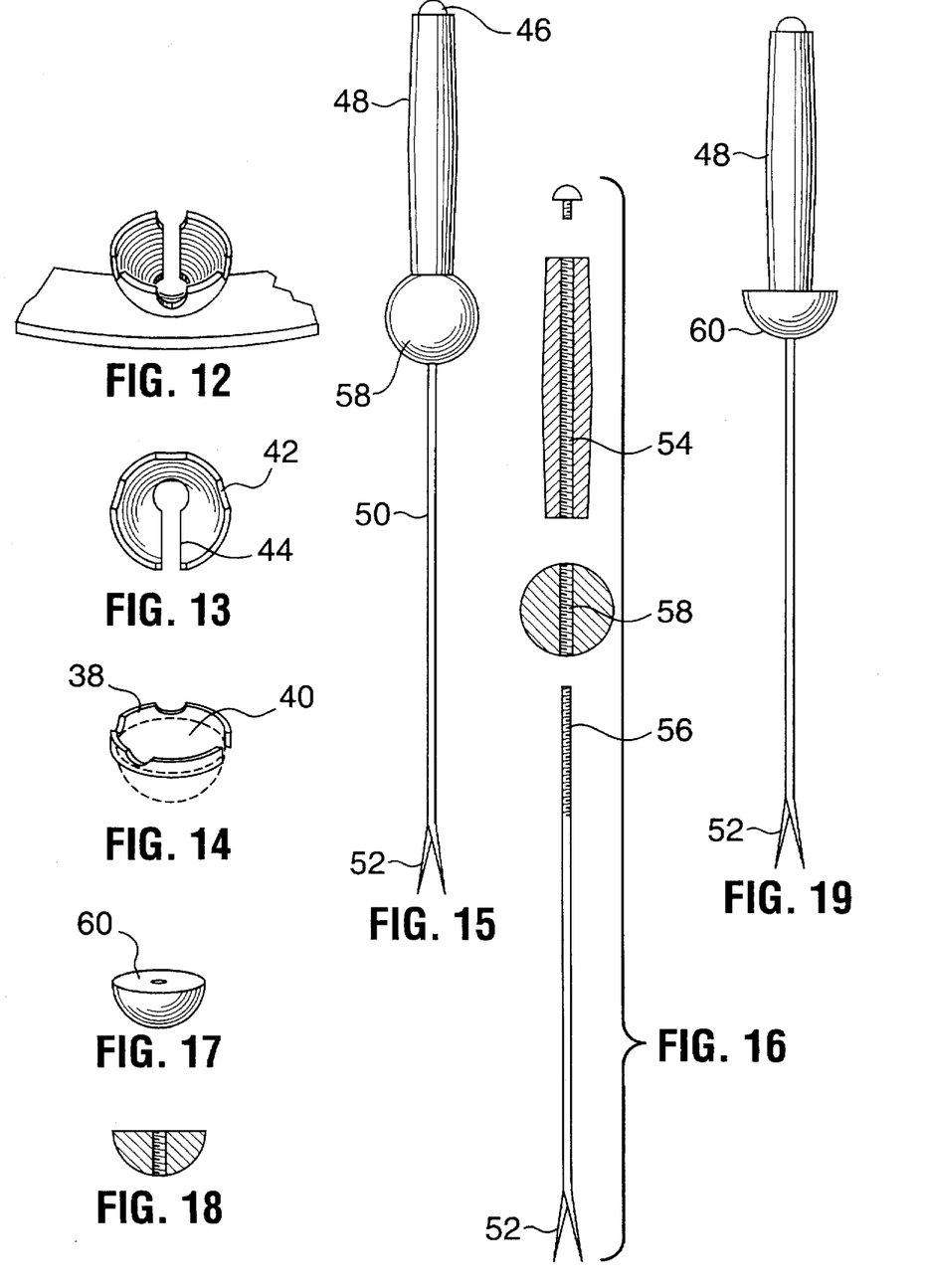
FIG. 12 is a fragment of perspective view of FIG. 9.
FIG. 13 is a top view of the holder according to the second embodiment.
FIG. 14 is a partial perspective view of 13 showing the semi-spherical configuration of the holding element.
FIG. 15 is a perspective view of the fork having a spherical stabilizing element.
FIG. 16 is a dis-assembled perspective view of the fork of FIG. 15.
FIG. 17 is a perspective view of semi-spherical stabilizing element.
FIG. 18 is a side view of the fork with semi-spherical stabilizing element.
FIG. 19 is a perspective view of the fork having a semi-spherical stabilizing element.
Figures 20, 21, 23, 24:
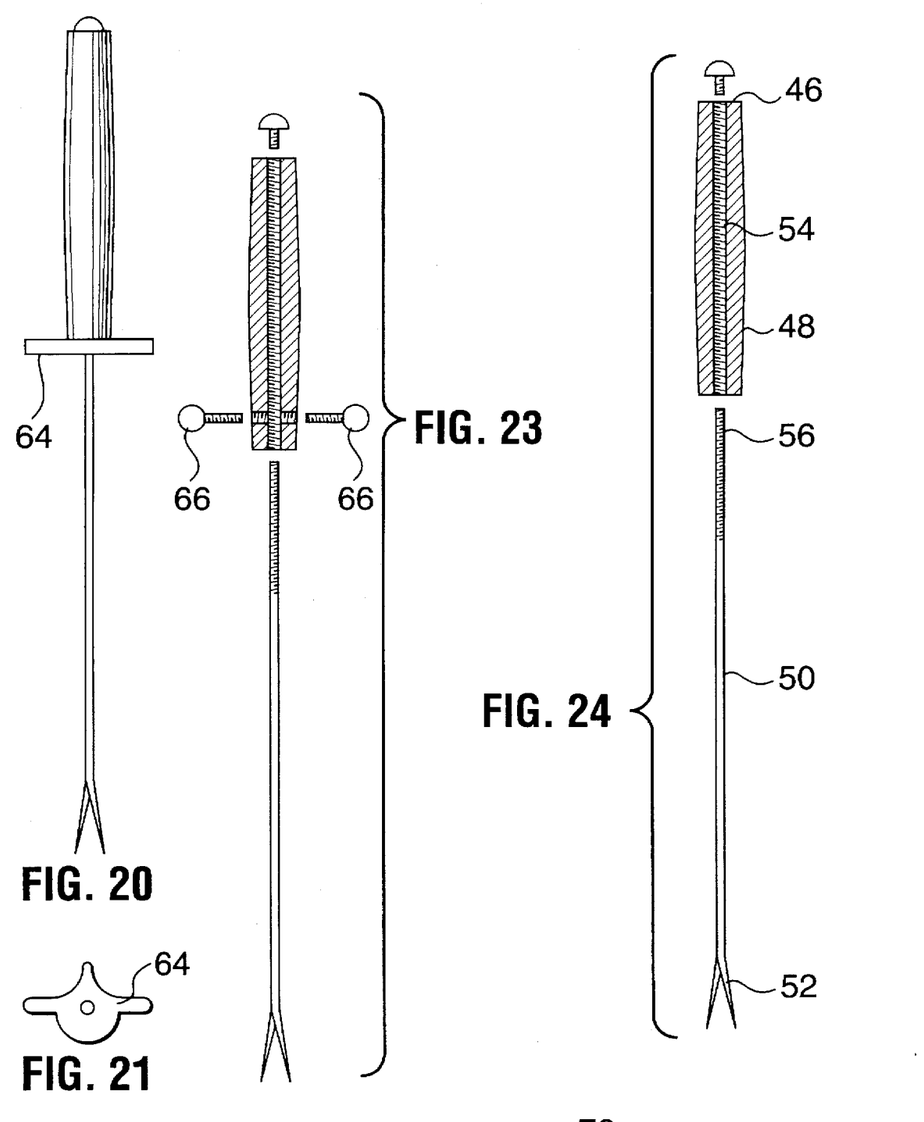
FIG. 20 is a cross-sectional side view of the three-arm stabilizing element.
FIG. 21 is top view of three-arm stabilizing element of FIG. 20.
FIG. 23 is a cross-sectional dis-assembled view of the fork having two-arm stabilizing element separately attached to the fork.
FIG. 24 is a cross-sectional view of the fork having adjustable means to change the length.
Figure 22A:
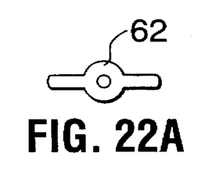
FIG. 22A is a top view of two-arm stabilizing element.
Figure 22B:
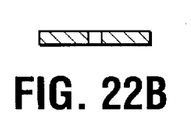
FIG. 22B is a cross-sectional view of FIG. 22A.
Figures 33, 34, 35:
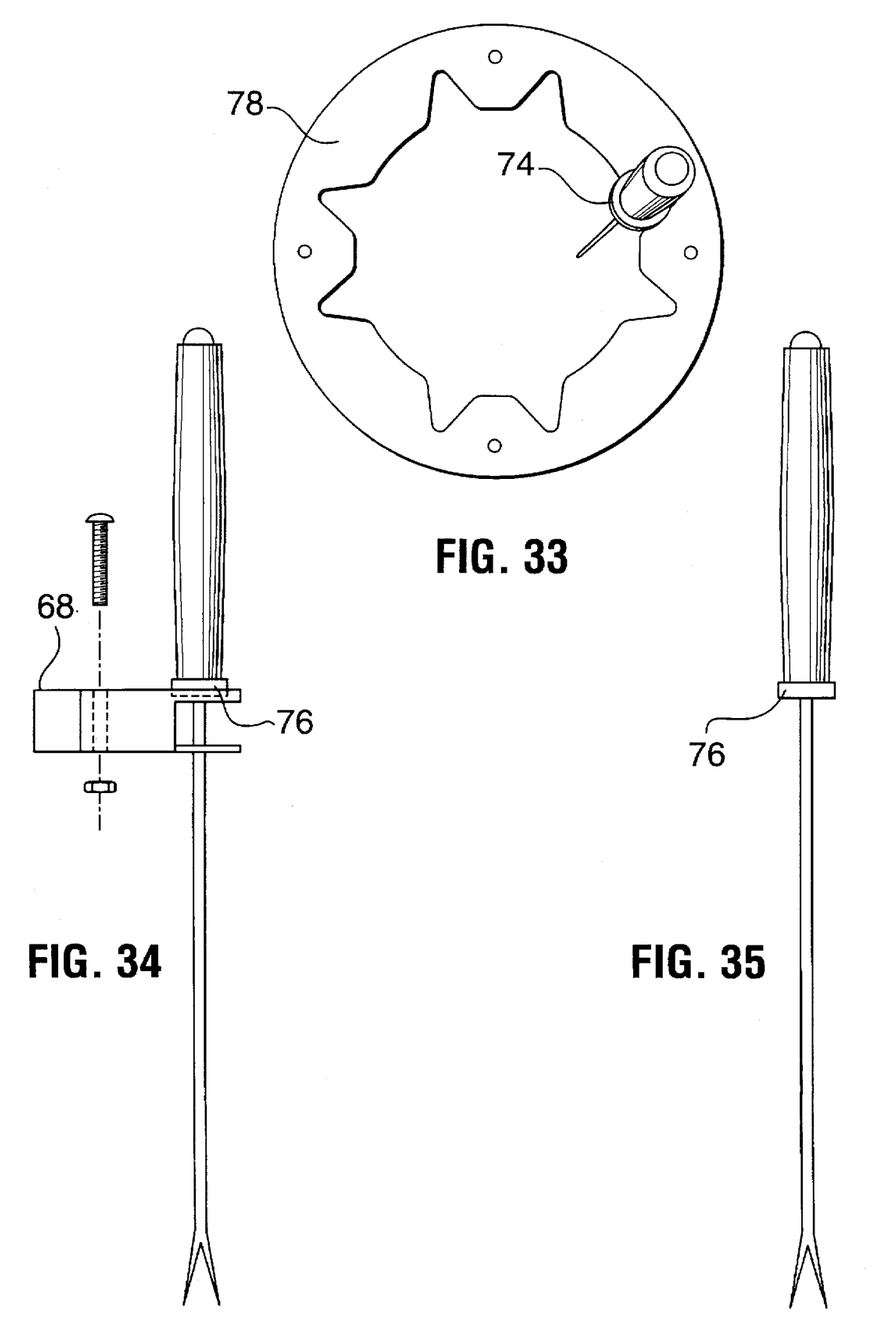
FIG. 33 is a perspective view of the cover using notches as holding elements in combination with the utensil of FIG. 32.
FIG. 34 is a side view of a holder of FIG. 27 in combination with the utensil having disk-shaped stabilizing element.
FIG. 35 is a side view of the utensil shown on FIG. 34.

FIGS. 15 to 26 show the utensil 46 for holding food also known as fondue fork. Utensil or fork comprises a stem 50, a handle 48 connected to the stem 50 at one end, and tines 52 connected to said stem 50 at the opposite end. Utensil 46 is provided with an adjustment means adapted to adjust the length of said utensil and including a bore portion 54 provided with a thread and located within the handle 48 and corresponding thread 56 on the stem 50. The adjustment of the length of the utensil 46 is provided by means of advancing stem 50 within the bore portion 54. This is a very useful feature of the present invention allowing to adapt the length of the fondue fork depending the size or depth of the cooking vessel, since, for example, vessels for preparing cheese or chocolate fondue usually is much more shallow then vessels for cooking Chinese fondue, Bourguigon fondue or any other similar type of fondue. Stabilizing elements for the fork are also provided with the corresponding thread which is necessary to tightly secure said stabilizing elements to the stem and handle of the fork. Fondue fork shown on FIG. 24 is adaptable to be used with the holding element 16 according the first embodiment of the present invention. Utensil of FIGS. 15 and 16 is provided with the stabilizing element 58 in the shape of sphere and is adapted to be used with the holder 38 of the second embodiment to be fit into the corresponding cavity 40. FIGS. 17 and 18 show stabilizing element 60 made in the shape of semi-sphere and is adapted also to fit into the cavity 40. FIGS. 20 and 21 shows three-arms stabilizing element 64 which is adapted to fit into grooves 42 formed on holding element 38. FIGS. 22A and 22B shows the two-arm stabilizing element 62 also fitting into grooves 42. FIG. 23 also shows two-arm stabilizing element 66 comprising of separate arms adapted to be screwed into the corresponding thread formed in the handle 48. FIGS. 25A and 25B and 35 show a disk-shaped stabilizing element 76 adapted to fit into the corresponding groove made on holding element 68 having a groove or cavity 70 (see FIG. 34) Stabilising elements of mentioned above modifications could be made separately or be an integral part of the handle 48.

Another important feature of the present invention is the configuration of the ends of the tines 52. In one embodiment shown on FIG. 37, each tine is bent in the opposite direction from each other with relation to the plan surface which allows to facilitate better holding of a piece of food impaled in said tines. In another embodiment shown on FIG. 26 each of tines 82 is first bent outwardly and then near the middle bent parallel to each other.

Figure 27:
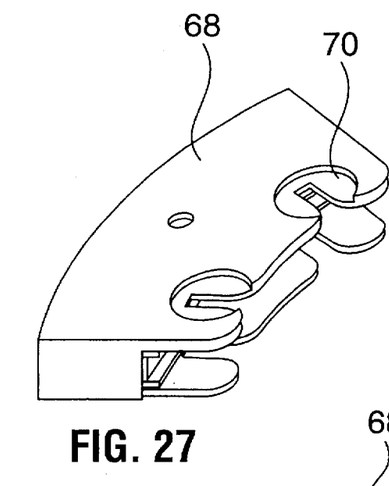
FIG. 27 a perspective view of holder having stabilizing element having a disk-shaped cavity for holding the handle of the fork.

FIG. 27 shows another modification of the holding element 68 which is similar to element 16; however, instead of using magnet as a stabilizing means, the top portion of element 68 is provided with a cavity or groove 70 having a disk shape which corresponds to the shape of the lower portion of the handle 48 of FIG. 24.

Figure 29:
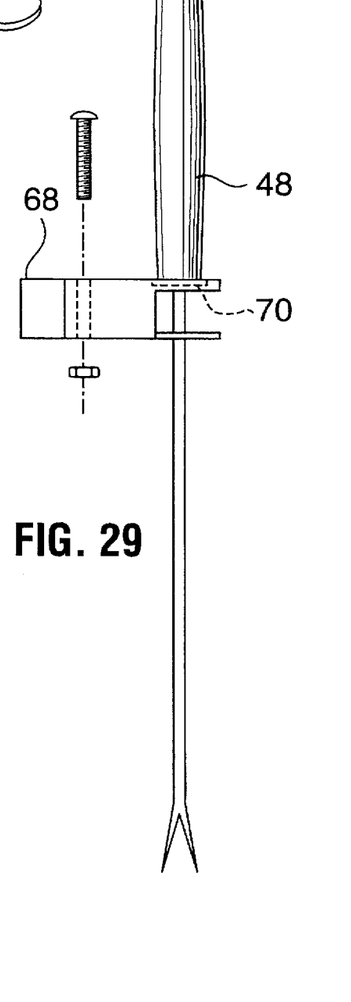
FIG. 29 is a side view of FIG. 27 in combination with the utensil.
Figures 30, 31:
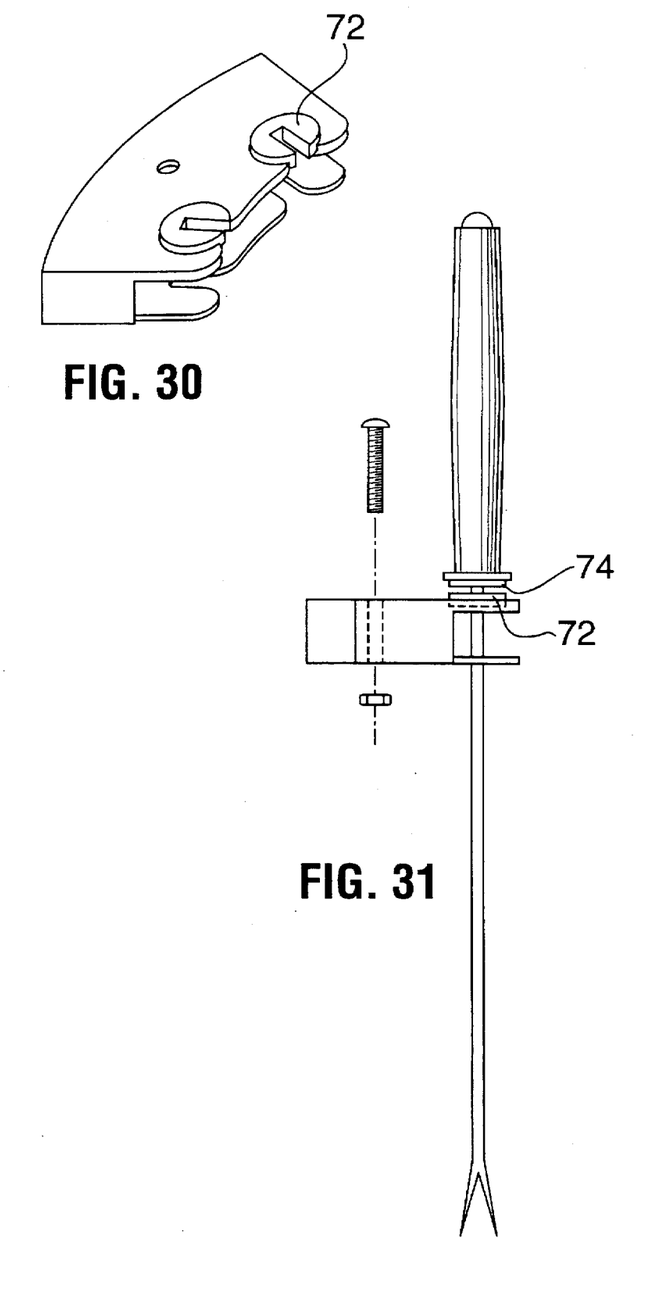
FIG. 30 is a perspective view of the holding element having a magnetic elements mounted on the top surface.
FIG. 31 is a side view of FIG. 30 in combination with the utensil provided with magnet.
Figure 32:
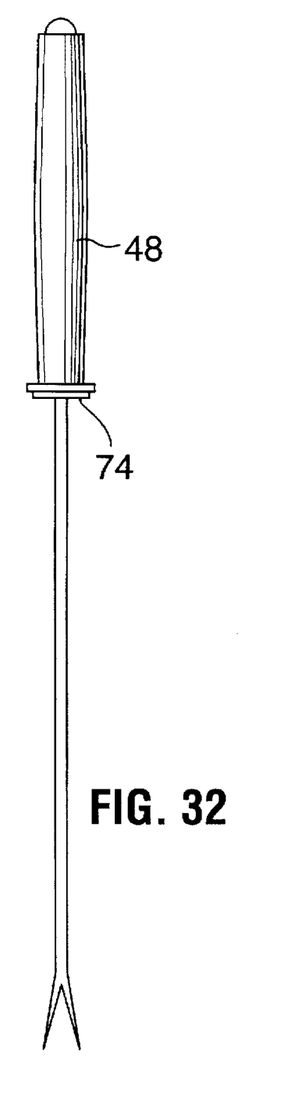
FIG. 32 is a side view of the utensil of FIG. 31.

In still another embodiment shown on FIG. 30, holding element comprises an insulating housing similar to FIG. 27, however instead of groove it has a magnet 72 having a shape of horse-shoe. This embodiment of the holding element may be used in combination with the utensil shown on FIG. 35 provided with the disk 76 or in combination with the utensil shown on FIG. 32 provided with both; disk 76 and magnetic stabilizing element 74. It is also possible to use a metal disk made of galvanized steel instead of magnet 72, wherein such disk has the same horse-shoe configuration. This disk may be mounted in the groove or cavity 70 of holding element 68 of FIG. 29 in combination with utensil provided with magnet 74, or vice versa, it may be mounted on the utensil in combination with the holding element of FIG. 30 having a magnet 72.

FIG. 33 shows a modification of the shape of the cover 78 provided with the slots or notches formed around the central opening, wherein those notches are serving two purposes: on one hand, they facilitate the proper position of the utensil, and on another hand they function as stabilizing means to provide verticality of the suspension of the utensil. In this modification, utensil having magnetic disk of FIG. 32 is used. The upper surface of cover 78 is formed substantially horizontal to provide proper positioning of utensils when in use. This modification is advantageous since it is very simple to manufacture.

Figures 36, 37:
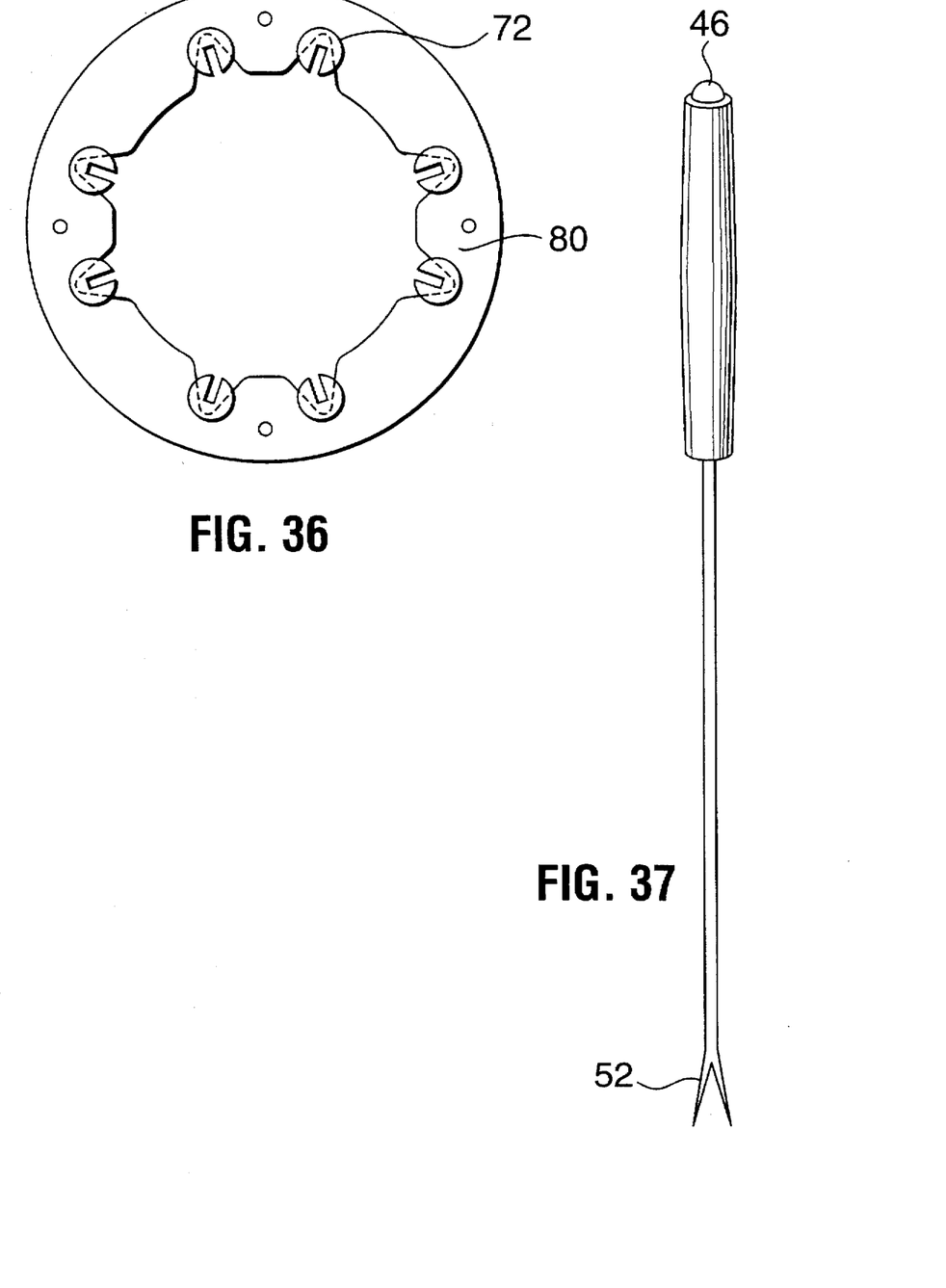
FIG. 36 is a perspective view of the cover provided with magnetic holding elements having a horse-shoe configuration
FIG. 37 is a side view of a fork having each tine bent in the opposite direction from each other.

FIG. 36 shows still another modification of the cover 80 provided with slots similar to cover of FIG. 33, but provided with a number of horse-shoe magnets 72 mounted on the cover 80. Those magnets 72 are similar to magnets of FIG. 30 and preferably, but not necessarily, are permanently attached to the horizontally positioned upper surface of the cover 80 to provide support of the utensil in vertical position. This modification of cover 80 is used in combination with utensils provided with metal disks similar to that shown on FIG. 35; preferably, but not necessarily, the thickness of such disks may be smaller. Also, utensil with magnet of FIG. 32 may be used in combination with the cover of FIG. 36

The cover 36 may be manufactured by means of moulding and embossment of holding element provided with stabilizing means and slots of desired configuration. Also it may be produced by means of hydraulic pressing, die-cutting, metal spinning, deep draw or any other mechanical means. Handle of the utensil 46 and stabilizing elements also may be manufactured by means of moulding, die-cutting, extrusion or any other mechanical methods, wherein the handle may be moulded together with stabilizing element as a unitary element.

One of the most important advantages of the present invention according to the second embodiment is the possibility to provides a built-in suspending structure by means of using a specially designed cover. Such combination of fondue vessels and covers allows the user to cook in a much more secure environment without any problems of splashing of hot oils or liquids, and gives the opportunity to keep utensils with food suspended vertically around said cover until the food is ready for eating. The access to the vessel is not interfered by any additional structure, and at the same time, each participant of the fondue meal can easily identify his or her personal utensil or fork. Preferably, but not necessary, holding element of the first embodiment is adapted to carry two forks; however, this depends on the particular situation and number of fondue participants.

Another important advantage of the present invention is the adjustability of the length of the utensil or fork 46 and improved structure of tines 52 eliminating possibility of food to slip off of the tines during the preparation of fondue, since split tines impale food in a spiral manner. This structure allows to retain impaled food much more securely than the conventional straight-tined fork, and split tines will keep food for twice as long. This advantage will reduce the possibility of losing of the piece of food at the bottom of the fondue vessel, thus preventing the highly undesirable common experience of food-searching.

Yet another advantage is the presence of stabilizing elements allowing to keep forks in a stable position by stabilizing means of the holding element, wherein the piece of food attached to the fork is acting as a weight and facilitates even better stabilizing of the fork. Besides, the user can easily recognize his/her fork since those forks are securely suspended in each designated slot.

Still another advantage of the present invention is that the fork is a two-in-one type in view of its adjustability, and thus may be used for both: chocolate and/or cheese fondue, Chinese fondue, Bourguigon, or any other type of fondue.

Cover with holding elements according to the present invention may be used not only for suspending plurality of utensils or forks during the preparation of fondue, but also for storage purposes, which is another advantage of the present invention.

Another important advantage of the present invention is complete elimination of any possibility of mixing or cris-crossing of utensils in use, which will be greatly appreciated by all fondue users.

The present invention may be embodied in other specific forms without departing from the spirit or essential attributes thereof and, accordingly, reference is made to the appended claims, rather than to the forgoing specification, as indicating the scope of the invention.

I claim:

1. A cooking apparatus comprising a combination of
   a vessel having an upstanding wall defining an upper edge providing a supporting surface for
   a removable cover having a centrally located opening therein, said cover is adapted to fit over the upper edge of said vessel;
   a number of holding elements located on said cover, each of said holding elements is adapted to hold a utensil for carrying food;
   wherein each of said holding elements comprises
      an insulation housing and
      suspension means adapted to immovably suspend said utensil for carrying food within said vessel in vertical position, thus preventing entanglement or cris-crossing of said utensil with other suspended utensils for carrying food when in use;
   wherein said suspension means comprises a combination of
      a magnetic element accommodated within said insulation housing and
      a utensil-receiving slot formed in said insulation housing, said utensil receiving slot is adjacent to said magnetic element and facilitates stable vertical positioning of said utensil for carrying food suspended by said magnetic element.

2. Apparatus according to claim 1, wherein each of said holding elements is permanently mounted on said cover.

3. Apparatus according to claim 2, wherein said holding elements are mounted on said cover by means of bolts and corresponding nuts.

4. Apparatus according to claim 2, wherein said apparatus further comprising a mounting ring provided with a central opening, and wherein said holding elements are accommodated between said mounting ring and said cover.

5. Apparatus according to claim 4, wherein inner edges in the central opening of said cover and said mounting ring having a configuration allowing unrestricted positioning of said utensils within the slots of said holding elements.

6. A removable cover for cooking vessel, said removable cover comprises
   a centrally located opening therein, said cover is adapted to fit over an upper edge of said cooking vessel;
   a number of holding elements located on said cover, each of said holding elements is adapted to hold a utensil for carrying food;
   wherein each of said holding elements comprises
      an insulation housing and
      suspension means, said suspension means are adapted to immovably suspend said utensil for carrying food within said vessel in vertical position, thus preventing entanglement or cris-crossing of said utensil with other suspended utensils for carrying food when in use;
   wherein said suspension means comprising a combination of
      a magnetic element accommodated within said insulation housing and
      a utensil-receiving slot formed in said insulation housing, said utensil receiving slot being adjacent to said magnetic element and is provided to facilitate stable vertical positioning of said utensil for carrying food suspended by said magnetic element.

7. Cover according to claim 6, wherein said holding elements are permanently mounted on said cover.

8. A holding element for holding a utensil for carrying food, said holding element is adapted to be mounted on a cover of a cooking vessel provided with a central opening, said holding element comprises
   an insulation housing and
   suspension means, said suspension means are adapted to immovably suspend said utensil for carrying food within said vessel in a stable vertical position, thus preventing entanglement or cris-crossing of said utensil with other suspended utensils for carrying food when in use;
   wherein said suspension means comprising a combination of
      a magnetic element accommodated within said insulation housing and a utensil-receiving slot formed in said insulation housing, said utensil receiving slot being adjacent to said magnetic element and is provided to facilitate stable vertical positioning of said utensil for carrying food suspended by said magnetic element.

9. Holding element according to claim 8, wherein said utensil receiving slot comprises an upper utensil receiving slot extending from a top portion of said housing and a lower receiving slot extending from a bottom portion of said housing, wherein said upper and lower receiving slots are aligned to each other and provided to additionally facilitate vertical stable positioning of said utensil.

10. A utensil for carrying food comprising a stem, a handle connected to said stem at one end, tines connected to said stem at the opposite end, and an adjustment means adapted to adjust the length of said utensil, wherein said adjustment means comprises a bore portion formed within said handle, said bore portion having a thread adapted to receive the end of said stem provided with corresponding thread, wherein the adjustment of the length of said utensil is provided by means of advancing of the end of said stem within said bore portion.

11. Utensil according to claim 10, wherein extreme ends of each tine is bent in the opposite direction from each other with relation to the plane surface thus facilitating a secure hold of a piece of food impaled on said tines.

* * * * *